US005627244A

United States Patent [19]

Sato

[11] Patent Number: 5,627,244
[45] Date of Patent: May 6, 1997

[54] PROCESS PRODUCING A POLYMER COMPRISING AN UNSATURATED CARBOXYLIC ACID OR A DERIVATIVE THEREOF

[75] Inventor: Tsuneyuki Sato, Tokushima, Japan

[73] Assignees: Sumitomo Chemical Co., Ltd., Osaka-fu; Nichia Chemical Industries Ltd., Tokushima, both of Japan

[21] Appl. No.: 427,841

[22] Filed: Apr. 26, 1995

[30]  Foreign Application Priority Data

Apr. 27, 1994 [JP] Japan .................... 6-089664

[51] Int. Cl.⁶ ..................... C08F 4/76; C08F 120/14
[52] U.S. Cl. ............ 526/92; 526/329.7; 526/240; 526/298; 526/303.1; 526/273; 526/91; 526/943; 522/66; 522/75; 522/79; 522/182
[58] Field of Search .................. 526/92, 329.7, 526/943; 522/66

[56]  References Cited

U.S. PATENT DOCUMENTS

| | | | |
|---|---|---|---|
| 3,037,004 | 5/1962 | Simone et al. | 526/92 |
| 3,050,504 | 8/1962 | Herman et al. | 526/92 |
| 3,053,817 | 9/1962 | Simone et al. | 526/92 |
| 3,114,737 | 12/1963 | Herman et al. | 526/92 |
| 5,034,307 | 7/1991 | Riediker et al. | 430/325 |
| 5,132,369 | 7/1992 | Yasuda et al. | 525/247 |

FOREIGN PATENT DOCUMENTS

| | | |
|---|---|---|
| 45-40059 | 12/1970 | Japan . |
| 46-9351 | 3/1971 | Japan . |
| 2-258808 | 10/1990 | Japan . |
| 3-255116 | 11/1991 | Japan . |
| 3-263412 | 11/1991 | Japan . |

OTHER PUBLICATIONS

R.L. Halterman (1992) Chem Rev 92, 965, 974–979, 992–994.
FA Cotton & G Wilkinson, Advanced Inorganic Chemistry, 5th Ed., 1988, Wiley, New York, 654, 658, 779.
H. Yuki and K. Hatada, Advances in Polymer Science, Springer-Verlag, Berlin Heidelberg, New York 1979, pp. 1–45.

*Primary Examiner*—Mark Nagumo
*Attorney, Agent, or Firm*—Sughrue, Mion, Zinn, Macpeak & Seas

[57]  ABSTRACT

Disclosed is a process for producing a polymer of an unsaturated carboxylic acid or a derivative thereof, the process comprising polymerizing an unsaturated carboxylic acid or a derivative thereof in a water-soluble organic solvent-water mixture in the presence of at least one polymerization catalyst selected from the group consisting of a metal compound of the formula $$L_p.M.X_q \qquad (1)$$

wherein M is Ti, Zr, Hf or V, L is cyclopentazienyl, indenyl, fluorenyl or a derivative of these, X is halo, H, lower alkyl, lower alkoxyl, aryloxy, phenyl or benzyl, p and q each represents an integer including 0 and p+q is equal to the valence of M, and a metal compound of the formula $$R.M.Y_r \qquad (2)$$

wherein M is defined above, R is a group formed by bonding, via a lower alkylene or di(lower alkyl)silylene group, two groups being cyclopentadienyl, indenyl, fluorenyl or a derivative of these, Y is halo, H, lower alkyl, lower alkoxyl, aryloxy, phenyl or benzyl, r is equal to the valence number of M minus 2.

20 Claims, No Drawings

PROCESS PRODUCING A POLYMER COMPRISING AN UNSATURATED CARBOXYLIC ACID OR A DERIVATIVE THEREOF

FIELD OF THE INVENTION

The present invention relates to a process for producing a polymer comprising an unsaturated carboxylic acid or a derivative thereof.

DESCRIPTION OF THE PRIOR ART

It is known that an unsaturated carboxylic acid or a derivative thereof can be polymerized by a conventional radical polymerization. Further, a process is known which comprises subjecting an unsaturated carboxylic acid or a derivative thereof to ionic polymerization in the presence of a certain organic metal compound as an initiator. For example, where the unsaturated carboxylic acid derivative is methyl methacrylate, there is disclosed a report on a process for obtaining a polymer thereof with a high stereoregularity by conducting polymerization at a low temperature using an organic alkali metal compound as an initiator (Adv. Polym. Sci., 31, 1 (1979)). Also disclosed are a process wherein polymerization is conducted at a low temperature using a Ziegler type catalyst (Japanese Examined Patent Publications (Kokoku) Nos. 40059/1970 and 9351/1970), a process wherein polymerization is conducted using a metallocene type catalyst prepared from a lanthanoid metal (Japanese Unexamined Patent Publications (Kokai) Nos. 258808/1990, 255116/1991 and 263412/1991), etc.

Moreover, processes for producing an acrylic resin having a high solvent resistance are disclosed in Japanese Examined Patent Publications Nos. 455/1983, 15490/1983, 34046/1987 and the like, wherein a chain transfer agent is added in an additional manner during radical polymerization of a monomer component predominantly comprising methyl methacrylate to obtain an acrylic resin having a wide molecular weight distribution.

However, when the above processes which comprise the step of adding a chain transfer agent during polymerization are employed to obtain a polymer having a high solvent resistance, there arises such problems that the procedures required therefor are troublesome and that unreacted chain transfer agent remains in the resulting polymer and causes an offensive odor.

SUMMARY OF THE INVENTION

An object of the present invention is to provide a process for producing a polymer comprising, as its constituent monomer, an unsaturated carboxylic acid or a derivative thereof, the process being free of troublesome procedures such as addition of a chain transfer agent during polymerization and being capable of giving a polymer having an excellent solvent resistance.

Thus, the present invention provides a process for producing a polymer comprising an unsaturated carboxylic acid or a derivative thereof, the process comprising subjecting a starting mixture containing (a) an unsaturated carboxylic acid or a derivative thereof and (b) a mixture of a water-soluble organic solvent and water to polymerization in the presence of a polymerization catalyst, wherein the starting mixture contains the unsaturated carboxylic acid or the derivative thereof at a concentration of 50 to 700 g per liter of the total volume of (a) the unsaturated carboxylic acid or the derivative thereof and (b) the mixture of the water-soluble organic solvent and water, and wherein the polymerization catalyst is at least one member selected from the group consisting of (1) a metal compound represented by the formula (1):

$$L_p \cdot M \cdot X_q \qquad (1)$$

wherein M is a member selected from the group consisting of Ti, Zr, Hf and V, L is at least one member selected from the group consisting of a cyclopentadienyl group, an indenyl group, a fluorenyl group and a derivative of these groups, X is at least one member selected from the group consisting of halogen, hydrogen, a lower alkyl group, a lower alkoxyl group, an aryloxy group, a phenyl group and a benzyl group, p and q each represents an integer including 0 and the sum of p and q equals the valence of M, and (2) a metal compound represented by the formula (2):

$$R \cdot M \cdot Y_r \qquad (2)$$

wherein M is a member selected from the group consisting of Ti, Zr, Hf and V, R is a group formed by bonding two identical or different groups selected from the group consisting of a cyclopentadienyl group, an indenyl group, a fluorenyl group and a derivative of these groups, the two groups being bonded to each other via a lower alkylene or di(lower alkyl)silylene group, Y is at least one member selected from the group consisting of halogen, hydrogen, a lower alkyl group, a lower alkoxyl group, an aryloxy group, a phenyl group and a benzyl group, r is equal to (n−2) wherein n is the valence of M.

DETAILED DESCRIPTION OF THE INVENTION

Unsaturated Carboxylic Acid or a Derivative Thereof

The unsaturated carboxylic acid or the unsaturated carboxylic acid contained in the derivative thereof for use in the present invention include acrylic acid, methacrylic acid, maleic acid, itaconic acid and the like.

The derivatives of the unsaturated carboxylic acid include anhydrides, esters, salts, amides, nitriles, ethers, etc. of the above unsaturated carboxylic acids.

Preferably, the unsaturated carboxylic acid and the derivatives thereof have a property of being dissolved in a mixture of the water-soluble organic solvents and water, which mixture will be described later in detail.

Anhydrides of the unsaturated carboxylic acid include, for example, maleic anhydride, itaconic anhydride and the like.

Esters of the unsaturated carboxylic acid include, for example, methacrylic acid esters, in particular $C_1$ to $C_{10}$ alkyl esters or benzyl ester of methacrylic acid, such as methyl methacrylate, ethyl methacrylate, propyl methacrylate, butyl methacrylate, benzyl methacrylate and the like; acrylic acid esters, in particular $C_1$ to $C_{10}$ alkyl esters of acrylic acid, such as methyl acrylate, ethyl acrylate, propyl acrylate, butyl acrylate, 2-ethylhexyl acrylate and the like; esters of acrylic or methacrylic acid with a $C_2$–$C_{10}$ di- or trihydric alcohol, such as 2-hydroxyethyl acrylate, 2-hydroxypropyl acrylate, acrylic acid monoglycerol ester, 2-hydroxyethyl methacrylate, hydroxypropyl methacrylate, methacrylic acid monoglycerol ester and the like; epoxy-containing esters of unsaturated carboxylic acids, such as glycidyl acrylate, glycidyl methacrylate and the like.

Salts of the unsaturated carboxylic acid include, for example, alkali metal salts such as sodium salt, potassium salt, etc., ammonium salt and the like of the unsaturated carboxylic acid.

Amides of the unsaturated carboxylic acid include, for example, acrylamide, methacrylamide, diacetone acrylamide and the like.

Nitriles of the unsaturated carboxylic acid include, for example, acrylonitrile, methacrylonitrile and the like.

Ethers of the unsaturated carboxylic acid include, for example, allyl glycidyl ether, methallyl glycidyl ether and the like.

Preferably useful are methyl methacrylate, ethyl methacrylate, methyl acrylate or ethyl acrylate.

The starting material of the process of the present invention may be one member of the above unsaturated carboxylic acids and derivatives thereof, or may be a mixture of two or more different members of the above unsaturated carboxylic acids and derivatives thereof.

Preferably usable are a methacrylic acid $C_1$–$C_{10}$ alkyl ester, particularly methyl methacrylate as such, and a mixture of a methacrylic acid $C_1$–$C_{10}$ alkyl ester (particularly methyl methacrylate) and other unsaturated carboxylic acids or a derivative or derivatives thereof, such as ethyl methacrylate, methyl acrylate or ethyl acrylate. If said mixture is employed, it is preferable that $C_1$–$C_{10}$ alkyl methacrylate such as methyl methacrylate be used in an amount of about 50 wt. % or more, preferably about 80 wt. % or more and less than 100 wt. %, based on the mixture.

A Mixture of a Water-Soluble Organic Solvent and Water

Examples of the water-soluble organic solvents for use in the present invention are alcohols, ethers, ketones, organic acids, amines, nitriles, sulfur compounds and the like. Alcohols include methanol, ethanol, 1-propanol, 2-propanol, 1-butanol, 2-butanol, 2-methyl-1-propanol, 2-methyl-2-propanol, ethylene glycol, diethylene glycol, glycerol and the like. Ethers include tetrahydrofuran, 1,4-dioxane and the like. The ketones include acetone and the like. The organic acids include formic acid, acetic acid, phthalic acid and the like. Nitriles include acetonitrile and the like. Amines include N,N-dimethylformamide, pyridine, hexamethylphosphoric triamide and the like. Sulfur compounds include dimethylsulfoxide and the like.

Among them, methanol, acetone, tetrahydrofuran and the like are preferred.

The water-soluble organic solvents can be used singly or at least two of them can be used in mixture.

The ratio of the water-soluble organic solvent (A) to water (B) by volume is preferably (A):(B)=1:2 to 9:1, more preferably (A):(B)=6:4 to 4:6. If the proportion of the water-soluble organic solvent is too small, the polymerization rate tends to be reduced since the concentration of the unsaturated carboxylic acid or a derivative thereof which is soluble in the water-soluble solvent-water mixture decreases. If the proportion of water is too small, the polymerization rate also decreases. It is preferable that the mixture of the water-soluble organic solvent and water forms a single phase without forming a two-phase system.

The concentration of the unsaturated carboxylic acid or the derivative thereof is 50 to 700 g, preferably 50 to 200 g, per liter of the total amount of the starting mixture of the water-soluble organic solvent and water and the unsaturated carboxylic acid or the derivative thereof.

If the concentration is too low in the starting mixture, the solvent resistance of the resulting polymer would be insufficient. In other words, the tetrahydrofuran-insoluble fraction, which exhibits or contributes to the solvent resistance, is produced only in a small amount.

If said concentration is too high in the starting mixture, the polymerization is not readily completed.

Polymerization Catalyst (1) Metal compound of the formula (1)

In the metal compound of the formula (1), L is one member selected from the group consisting of a cyclopentadienyl group, an indenyl group, a fluorenyl group and derivatives of these groups. Said derivatives include methylcyclopentadienyl, 1,2-dimethylcyclo-pentadienyl, 1,3-dimethylcyclopentadienyl, pentamethyl-cyclopentadienyl, n-butylcyclopentadienyl, tert-butylcyclopentadienyl, trimethylsilylcyclopentadienyl, 3-methylindenyl, 4-methylindenyl, 5-methylindenyl, 5-ethylindenyl, 4,7-dimethylindenyl and the like. However, the derivatives are not limited to these examples. Among them, cyclopentadienyl group is preferred.

p is an integer of not less than 0, and may particularly represent an integer of 0–5. When p is 2 or more, the groups represented by L may be the same or different.

X is at least one member selected from the group consisting of halogen, hydrogen, a lower alkyl group, a lower alkoxyl group, an aryloxy group, a phenyl group and a benzyl group. The lower alkyl include, for example, an alkyl group having 1 to 6 carbon atoms, such as a methyl group and an ethyl group, the lower alkoxyl group include, for example, an alkoxyl group having 1 to 6 carbon atoms such as a methoxy group and an ethoxy group, and the aryloxy group include, for example, an aryloxy group having 6 to 12 carbon atoms such as a phenoxy group, a methylphenoxy group and an ethylphenoxy group.

Preferred examples of X are halogen atoms such as chlorine, bromine and the like.

q is an integer of not less than 0, and may particularly represent an integer of 0–5. When q is 2 or more, the groups represented by X may be the same or different.

M is Ti, Zr, Hf or V. The valence of M can be any of those exhibited by the element. Specifically stated, Ti may have a valence of 1 to 4, Zr 1 to 4, Hr 1 to 4 and V 1 to 5. Preferred valence number is 3 to 5. The sum of p and q above is equal to the valence number of M.

Specific examples of the metal compound represented by the formula (1) are given below.

Compounds of the formula (1) wherein M is Ti include, for example, titanocene, titanium trihalide, methyl titanium dihalide, dimethyl titanium halide, (η-cyclopentadienyl) titanium dihalide, bis(η-cyclopenta-dienyl) titanium halide, (η-pentamethylcyclopentadienyl) titanium dihalide, bis(η-pentamethylcyclopentadienyl) titanium halide, titanium tetrahalide, (η-cyclopenta-dienyl) titanium trihalide, bis(η-cyclopentadienyl) titanium dihalide, tris(η-cyclopentadienyl) titanium halide, (η-pentamethylcyclopentadienyl) titanium trihalide, bis(η-pentamethylcyclopentadienyl) titanium dihalide, tris(η-pentamethylcyclopentadienyl) titanium halide, trimethyl(η-cyclopentadienyl) titanium, dimethylbis(η-cyclopentadienyl) titanium, trimethyl (η-pentamethylcyclopentadienyl) titanium, dimethylbis (η-pentamethylcyclopentadienyl) titanium, methyl titanium trihalide, tetraethoxy titanium, methyltriethoxy titanium, dimethyldiethoxy titanium, methyltriethoxy titanium, ethoxy titanium trihalide, diethoxy titanium dihalide, triethoxy titanium halide, methyltriisopropoxy titanium, dimethyldiisopropoxy titanium, methyl-triisopropoxy titanium, tetraisopropoxy titanium, tetra-n-butoxy titanium, bis(η-cyclopentadienyl- )diphenyl titanium, bis(η-pentamethylcyclopentadienyl-)diphenyl titanium, bis(η-pentamethylcyclopentadienyl) titanium dihydride, bis(η-cyclopentadienyl)dibenzyl titanium, bis(η-pentamethylcyclopentadienyl)dibenzyl titanium, bis(η-indenyl) titanium dihalide, (η-indenyl) (η-cyclopentadienyl) titanium dihalide, (η-cyclopentadienyl) diphenoxy titanium, methyltriphenoxy titanium, dimethyldiphenoxy titanium, tetraphenoxy titanium and the like. In these compounds, the above-exemplified halides are generally chlorides. Among them, those of the formula (1) wherein M is Ti, L is a cyclopentadienyl group, p is 2, X is halogen and q is 2 such as titanocene, bis(η-pentamethylcyclopentadienyl)titanium dihalide, bis(η-pentamethylcyclopentadienyl)diphenyl titanium and the like are preferably used. The compound of the formula (1) wherein M is Ti, p is 0, X is a lower alkoxy and q is 4 is also preferred.

Compounds of the formula (1) wherein the metal represented by M is Zr include, for example, zirconium trihalide, methyl zirconium dihalide, dimethyl zirconium halide, (η-cyclopentadienyl) zirconium dihalide, bis(η-cyclopentadienyl) zirconium halide, (η-pentamethylcyclopentadienyl) zirconium dihalide, bis(η-pentamethylcyclopentadienyl) zirconium halide, zirconium tetrahalide, (η-cyclopentadienyl) zirconium trihalide, bis(η-cyclopentadienyl) zirconium dihalide, tris(η-cyclopentadienyl) zirconium halide, (η-pentamethylcyclopentadienyl) zirconium trihalide, bis(η-pentamethyl-i cyclopentadienyl) zirconium dihalide, tris(η-pentamethylcyclopentadienyl) zirconium halide, trimethyl(η-cyclopentadienyl) zirconium, dimethylbis (η-cyclopentadienyl) zirconium, trimethyl (η-pentamethylcyclopentadienyl) zirconium, dimethylbis (η-pentamethylcyclopentadienyl) zirconium, methyl zirconium trihalide, tetraethoxy zirconium, methyltriethoxy zirconium, dimethyldiethoxy zirconium, methyltriethoxy zirconium, ethoxy zirconium trihalide, diethoxy zirconium dihalide, triethoxy zirconium halide, methyltriisopropoxy zirconium, dimethyldiisopropoxy zirconium, methyl-triisopropoxy zirconium, tetraisopropoxy zirconium, tetra-n-butoxy zirconium, bis(η-cyclopentadienyl)diphenyl zirconium, bis(η-pentamethylcyclopentadienyl)diphenyl zirconium, bis(η-pentamethylcyclopentadienyl) zirconium dihydride, bis(η-cyclopentadienyl)dibenzyl zirconium, bis(η-pentamethylcyclopentadienyl)dibenzyl zirconium, bis(n-indenyl) zirconium dihalide, (η-indenyl)(η-cyclopentadienyl) zirconium dihalide, (η-cyclopentadienyl)diphenoxy zirconium, methyltriphenoxy zirconium, dimethyldiphenoxy zirconium, tetraphenoxy zirconium and the like. In these compounds, the above-exemplified halides are generally chlorides. Among them, (η-cyclopentadienyl) zirconium dihalide and the like are preferably used.

Compounds of the formula (1) wherein the metal represented by M is Hf include, for example, hafnium trihalide, methyl hafnium dihalide, dimethyl hafnium halide, (η-cyclopentadienyl) hafnium dihalide, bis(η-cyclopentadienyl) hafnium halide, (η-pentamethyl-cyclopentadienyl) hafnium dihalide, bis(η-pentamethyl-cyclopentadienyl) hafnium halide, hafnium tetrahalide, (η-cyclopentadienyl) hafnium trihalide, bis(η-cyclopentadienyl) hafnium dihalide, tris(η-cyclopentadienyl) hafnium halide, (η-pentamethylcyclopentadienyl) hafnium trihalide, bis(η-pentamethylcyclopentadienyl) hafnium dihalide, tris(η-pentamethylcyclopentadienyl) hafnium halide, trimethyl(η-cyclopentadienyl) hafnium, dimethylbis(η-cyclopentadienyl) hafnium, trimethyl(η-pentamethylcyclopentadienyl) hafnium, dimethylbis(η-pentamethylcyclopentadienyl) hafnium, methyl hafnium trihalide, tetraethoxy hafnium, methyltriethoxy hafnium, dimethyldiethoxy hafnium, methyltriethoxy hafnium, ethoxy hafnium trihalide, diethoxy hafnium dihalide, triethoxy hafnium halide, methyltriisopropoxy hafnium, dimethyl-diisopropoxy hafnium, methyltriisopropoxy hafnium, tetraisopropoxy hafnium, tetra-n-butoxy hafnium, bis(η-cyclopentadienyl)diphenyl hafnium, bis(η-pentamethylcyclopentadienyl)diphenyl hafnium, bis(η-pentamethyl-cyclopentadienyl) hafnium, bis(η-cyclopenta-dienyl)dibenzyl hafnium dihydride, bis(η-pentamethylcyclopentadienyl)dibenzyl hafnium, bis(η-indenyl)hafnium dihalide, (η-indenyl)(η-cyclopentadienyl) hafnium dihalide, (η-cyclopentadienyl)diphenoxy hafnium, methyltriphenoxy hafnium, dimethyldiphenoxy hafnium, tetraphenoxy hafnium and the like. In these compounds, the above-exemplified halides are generally chlorides. Among them, (η-cyclopentadienyl) hafnium dihalide and the like are preferably used.

Compounds of the formula (1) wherein the metal represented by M is V include, for example, bis(η-cyclopentadienyl) vanadium, bis(η-pentamethylcyclopentadienyl) vanadium, vanadium trihalide, methyl vanadium dihalide, dimethyl vanadium halide, (η-cyclopentadienyl) vanadium dihalide, bis(η-cyclopentadienyl) vanadium halide, (η-pentamethylcyclopentadienyl) vanadium dihalide, bis(η-pentamethylcyclopentadienyl) vanadium halide, vanadium tetrahalide, (η-cyclopentadienyl) vanadium trihalide, bis(η-cyclopentadienyl) vanadium dihalide, tris(η-cyclopentadienyl) vanadium halide, (η-pentamethylcyclopentadienyl) vanadium trihalide, bis(η-pentamethylcyclopentadienyl) vanadium dihalide, tris(η-pentamethylcyclopentadienyl) vanadium halide, trimethyl(η-cyclopentadienyl) vanadium, dimethylbis(η-cyclopentadienyl) vanadium, trimethyl(η-pentamethylcyclopentadienyl) vanadium, dimethylbis(η-pentamethylcyclopentadienyl) vanadium, methyl vanadium trihalide, tetraethoxy vanadium, methyltriethoxy vanadium, dimethyldiethoxy vanadium, methyltriethoxy vanadium, ethoxy vanadium trihalide, diethoxy vanadium dihalide, triethoxy vanadium halide, dimethyldiisopropoxy vanadium, methyltriisopropoxy vanadium, tetraisopropoxy vanadium, tetra-n-butoxy vanadium, bis(η-cyclopentadienyl-)diphenyl vanadium, bis(η-pentamethylcyclopentadienyl)diphenyl vanadium, bis(η-pentamethylcyclopentadienyl) vanadium, bis(η-cyclopentadienyl)dibenzyl vanadium dihydride, bis(η-pentamethylcyclopentadienyl)dibenzyl vanadium, bis(η-indenyl) vanadium dihalide, (η-indenyl) (η-cyclopentadienyl) vanadium dihalide, (η-cyclopentadienyl)diphenoxy vanadium, methyltriphenoxy vanadium, dimethyldiphenoxy vanadium, tetraphenoxy vanadium and the like. In these compounds, the above-mentioned halides are generally chloride. Among them, bis(η-cyclopentadienyl) vanadium and the like are preferably used.

Among the metal compounds represented by the formula (1), particularly preferred are metal compounds wherein M is Ti, and especially preferred titanium compound is titanocene.

(2) Metal Compound Represented by the Formula (2)

In the metal compound represented by the formula (2), R is a group formed by bonding two identical or different groups selected from the group consisting of a cyclopentadienyl group, an indenyl group, a fluorenyl group and derivatives of these groups, the two groups being bonded to each other via a lower alkylene or di(lower alkyl)silylene group.

Said derivatives of a cyclopentadienyl group, an indenyl group and a fluorenyl groups include, for example, methylcyclopentadienyl, 1,2-dimethylcyclopentadienyl, 1,3-dimethylcyclopentadienyl, pentamethylcyclopentadienyl, n-butylcyclopentadienyl, tert-butylcyclopentadienyl, trimethylsilylcyclopentadienyl, 3-methylindenyl, 4-methylindenyl, 5-methylindenyl, 5-ethylindenyl, 4,7-dimethylindenyl and the like.

Said lower alkylene group may be a straight- or branched-chain $C_1$-$C_4$ alkylene group, such as methylene (—$CH_2$—), ethylene (—$CH_2CH_2$—), dimethylmethylene (—$C(CH_3)_2$—), 2,3-dimethyl-2,3-butylene (—$C(CH_3)_2C(CH_3)_2$—) and the like.

Said di(lower alkyl)silylene group may be a di($C_1$-$C_4$ alkyl)silylene group, such as dimethylsilylene, diethylsilylene, and the like.

The groups represented by R include, for example, ethylenebis(indenyl), ethylenebis(tetrahydro-indenyl), dimethylmethylene(cyclopentadienyl) (fluorenyl), dimethylsilylenebis(indenyl), dimethylsilylenebis-(tetrahydroindenyl), dimethylsilylene(cyclopentadienyl) (fluorenyl) and the like, but is not limited to these examples. Preferred examples are ethylenbis(indenyl), ethylenebis (tetrahydroindenyl) and the like.

Y has the same meaning as X, and is at least one member selected from the group consisting of halogen, hydrogen, a lower alkyl group, a lower alkoxyl group, an aryloxy group, a phenyl group and a benzyl group. The lower alkyl group include, for example, an alkyl group having 1 to 6 carbon atoms and the lower alkoxyl group include, for example, an alkoxyl group having 1 to 6 carbon atoms.

Preferred examples of Y are halogen atoms such as chlorine, bromine and the like.

r is an integer of not less than 0 and may particularly represent 0-5. When r is 2 or more, the groups represented by Y may be the same or different.

M in the formula (2) has the same meaning as M in the formula (1). Preferable valence number of M is 3 to 5, and r is equal to (n−2) wherein n is a valence number of M.

Specific examples of the metal compound represented by the formula (2) include (η-ethylene-bisindenyl) titanium dihalide, (η-ethylenebis tetrahydroindenyl) titanium dihalide, {η-dimethylmethylene(cyclopentadienyl) (fluolenyl)} titanium dihalide, (η-ethylenebisindenyl) zirconium dihalide, (η-ethylenebis tetrahydroindenyl) zirconium dihalide, {η-dimethylmethylene(cyclopentadienyl) (fluorenyl) } zirconium dihalide, (η-ethylenebisindenyl) hafnium dihalide, (η-ethylenebis tetrahydroindenyl) hafnium dihalide, {η-dimethylmethylene(cyclopentadienyl) (fluorenyl)} hafnium dihalide, (η-ethylenebisindenyl) vanadium dihalide, (η-ethylenebis tetrahydroindenyl) vanadium dihalide, {η-dimethylmethylene(cyclopentadienyl) (fluorenyl)} vanadium dihalide; dimethylsilylene (cyclopentadienyl)(fluolenyl) titanium dihalide, dimethylsilylene(cyclopentadienyl)(fluorenyl) zirconium dihalide, dimethylsilylene(cyclopentadienyl)(fluorenyl) hafnium dihalide, dimethylsilylene(cyclopentadienyl) (fluorenyl) vanadium dihalide and the like. In these compounds, the above-exemplified halides are generally chlorides.

Among the metal compounds represented by the formula (2), the metal compounds wherein M is Ti are preferred, and (η-ethylenebisindenyl) titanium dihalide and the like are especially preferred.

All of the metal compounds represented by the formulas (1) and (2) are known compounds.

According to the present invention, the metal compounds represented by the formulas (1) and (2) may be used singly or at least two different compounds of the metal compounds represented by the formulas (1) and (2) can be used in combination.

The concentration of the metal compound is preferably $1\times10^{-4}$ to $2\times10^{-2}$ mole, more preferably $1\times10^{-3}$ to $1\times10^{-2}$ mole, per liter of the total volume of the polymerization reaction system, i.e., the total volume of the water-soluble organic solvent-water mixture, the unsaturated carboxylic acid or the derivative thereof and at least one of the metal compounds of the formulas (1) and (2). If the concentration is lower than $1\times10^{-4}$ mole/liter, prolonged polymerization time is usually required, and if the concentration is higher than $2\times10^{-2}$ mole/liter, the polymerization rate tends to decrease.

The reaction of the present invention can be conducted by various processes, but typically the following process may be employed.

Thus, the metal compound is placed into a reactor and a mixture of water and a water-soluble organic solvent is added to dissolve the metal compound. Then, an unsaturated carboxylic acid or a derivative thereof is added, and the resulting mixture is homogeneously mixed and subjected to the polymerization reaction.

Specifically stated, a reactor is charged with a prescribed amount of at least one member of the metal compounds represented by the formulas (1) and (2), and the oxygen in the reactor is preferably replaced by an inert gas. The inert gas may, for example, be nitrogen gas, argon gas or the like. If oxygen is present in the reactor, termination reaction tends to occur, and thus the reaction may hardly proceed. Preferred reactors are autoclaves or flasks made of glass, stainless steel, etc.

Subsequently, a mixture of water and a watersoluble solvent previously deoxygenated with use of an inert gas is added to dissolve the metal compound.

Then, an unsaturated carboxylic acid or a derivative thereof previously deoxygenated with use of an inert gas is added, and the mixture is homogeneously mixed and maintained at a prescribed polymerization temperature.

The metal compound, water-soluble organic solvent-water mixture, and unsaturated carboxylic acid or derivative thereof may be placed into the reactor in any other order.

The polymerization temperature can generally range from −10° C. to the ceiling temperature, and preferably is 20° to 80° C.

The reaction time can be about 1 to 72 hours, preferably about 4 to 48 hours.

The polymerization reaction is usually conducted under atmospheric pressure but may be conducted at an elevated pressure, e.g. at about 1 to 100 kg/cm$^2$.

The polymerization is promoted by irradiation with light, such as natural light, light of fluorescent tube, light of mercury lamp, etc.

The polymerization is terminated by adding a mineral acid such as diluted hydrochloric acid or a small amount of concentrated hydrochloric acid.

After termination of the reaction, the polymer is separated by adding the polymerization mixture to a poor solvent such as methanol, ethanol and the like, and collecting the precipitated polymer by filtration or like solid-liquid separation method.

If it is necessary to obtain the desired polymer substantially free of the polymerization catalyst, it is preferable that the poor solvent used for precipitating the polymer can dissolve the polymerization catalyst. Such poor solvent include, for example, methanol, ethanol and the like.

Furthermore, if the polymerization is conducted in such solvent that can dissolve the polymerization catalyst but does not substantially dissolve the resulting polymer, such as methanol, ethanol or the like, the resulting polymer can be isolated by simply filtering the reaction mixture.

According to the process of the present invention, a polymer containing large amount of a tetrahydrofuran insoluble fraction can be obtained. Since the obtained polymer has an excellent solvent resistance, products coated with the polymer and products prepared from the polymer exhibit an excellent solvent resistance.

EXAMPLES

The following Examples are further illustrative of the present invention but are by no means limitative of the scope of the invention.

In the Examples, the obtained polymers were evaluated by the following procedures.

(1) THF-insoluble fraction content

The obtained polymer was stirred in about 300-fold quantity (by volume) of tetrahydrofuran (THF) for 12 hours at room temperature (20°–25° C.). The resulting mixture was separated using a centrifugal separator into an insoluble solid and a solution. The solution was added to about 10 to 20 fold quantity (by volume) of methanol, and the precipitate was collected as the soluble fraction. The THF-insoluble fraction content(%) was calculated by the following equation:

THF-insoluble fraction content (%)=$100 \times W_1/W_2$ wherein $W_1$ is the weight of (THF-insoluble fraction) and $W_2$ is the weight of (THF-insoluble fraction)+(THF-soluble fraction).

(2) Solvent resistance

The obtained polymer was dissolved in chloroform to prepare about 3 wt. % solution, and the solution was applied to the surface of a glass plate. Then, the chloroform was evaporated to obtain a cast film having a thickness of about 50 μm.

A drop of each solvent, i.e., glacial acetic acid, ethyl acetate, THF or methyl ethyl ketone (MEK) was allowed to fall on the film using a dropping pipet. One hour later, the appearance of the film was observed and evaluated according to the following criteria.

Crack: Fine cracks occur in the portion on which a drop of the solvent was allowed to fall.

Trace: Only a whitish trace or spot remains in the portion on which a drop of the solvent was allowed to fall.

None: No crack or no whitish trace or spot was observed.

Example 1

A 300-ml, transparent, round-bottom flask was charged with $1.5 \times 10^{-4}$ mole of biscyclopentadienyl titanium dichloride ($Cp_2TiCl_2$), and then equipped with a three-way cock and nitrogen gas was introduced into the flask to displace the air therein.

A 100 ml quantity of a mixture of water and methanol (water:methanol=1:1 by volume) which had been previously deoxygenated with use of nitrogen gas was placed into the flask to dissolve the biscyclopentadienyl titanium dichloride, and then 10 g of methyl methacrylate (MMA) previously deoxygenated with use of nitrogen gas was added thereto.

While mixed homogeneously, the solution was heated to 40° C. and maintained at this temperature. The solution was allowed to stand for 10 hours under irradiation with light by a 15-W fluorescent tube placed at a distance of about 30 cm from the flask.

After completion of the reaction, the precipitated polymer was collected by filtration and dried with a vacuum dryer.

The yield and THF-insoluble fraction content of the obtained polymer are shown in Table 1.

In Table 1, the concentration of the polymerization catalyst is expressed in terms of mmoles per liter of the total volume of the polymerization reaction system, i.e., the total volume of the water-soluble organic solvent-water mixture, MMA and the polymerization catalyst.

Also in Table 1, the concentration of MMA is expressed in terms of g per liter of the total volume of a water-soluble organic solvent-water mixture and MMA.

Examples 2 to 7 and Comparative Examples 1 to 3

The procedure of Example 1 was repeated using the polymerization catalyst, monomer and mixture of a water-soluble solvent and water shown in Table 1 under the reaction conditions (polymerization time, polymerization temperature and irradiation with light by means of a fluorescent tube) shown in Table 1.

The yield and THF-insoluble fraction content of each of the obtained polymers are shown in Table 1.

Example 8

The polymer obtained in Example 4 was tested for solvent resistance. The result is shown in Table 2.

Comparative Examples 4 and 5

The polymer obtained in Comparative Example 2 and Sumipex 000, a commercially available polymethyl methacrylate plate, were tested for solvent resistance. The results are shown in Table 2.

TABLE 1

| | Polymerization catalyst | | MMA | Solvent | Polymerization | Polymerization | | | THF-insoluble |
|---|---|---|---|---|---|---|---|---|---|
| | Kind | Conc. mmoles/ liter | Conc. g/ liter | A:B* volume ratio | ization time (hrs) | tempera- ture (°C.) | Light irradiation | Yield (%) | fraction content (%) |
| Example | | | | | | | | | |
| 1 | $Cp_2TiCl_2$ | 1.5 | 93.5 | 1:1 | 10 | 40 | Irradiated | 77.2 | 29.9 |
| 2 | $Cp_2TiCl_2$ | 1.5 | 93.5 | 1:9 | 10 | 40 | Irradiated | 24.6 | 8.1 |
| 3 | $Cp_2TiCl_2$ | 1.5 | 93.5 | 7:3 | 10 | 40 | Irradiated | 67.2 | 17.6 |
| 4 | $Cp_2TiCl_2$ | 1.5 | 93.5 | 1:1 | 10 | 40 | None | 42.0 | 18.9 |
| 5 | $Cp_2TiCl_2$ | 1.5 | 93.5 | 1:1 | 10 | 40 | Irradiated | 99.0 | 63.9 |
| 6 | $Ti(OC_2H_5)_4$ | 1.5 | 93.5 | 1:1 | 10 | 40 | Irradiated | 18.2 | 2.3 |
| 7 | $Cp_2TiCl_2$ | 1.5 | 600 | 1:1 | 24 | 40 | Irradiated | 12.1 | 4.6 |
| Comp. Ex. | | | | | | | | | |

TABLE 1-continued

| | Polymerization catalyst | | MMA | Solvent | Polymer- | Polymerization | | | THF-insoluble |
| --- | --- | --- | --- | --- | --- | --- | --- | --- | --- |
| | Kind | Conc. mmoles/ liter | Conc. g/ liter | A:B* volume ratio | ization time (hrs) | tempera- ture (°C.) | Light irradiation | Yield (%) | fraction content (%) |
| 1 | $Cp_2TiCl_2$ | 1.5 | 30 | 1:1 | 10 | 40 | None | 8.8 | 0 |
| 2 | $Cp_2TiCl_2$ | 1.5 | 30 | 1:1 | 4 | 40 | Irradiated | 13.5 | 0 |
| 3 | $Cp_2TiCl_2$ | 1.5 | 920 | None | 10 | 40 | Irradiated | 0 | 0 |

*A = methanol  B = water

TABLE 2

| | Polymer | Glacial acetic acid | Ethyl acetate | THF | MEK |
| --- | --- | --- | --- | --- | --- |
| Ex. 8 | Example 4 | Trace | Trace | Trace | None |
| Comp. Ex. 4 | Comp. Ex. 2 | Crack | Crack | Crack | Crack |
| Comp. Ex. 5 | Sumipex 000 | Crack | Crack | Crack | Crack |

I claim:

1. A process for producing a polymer comprising a monomer selected from the group consisting of an unsaturated carboxylic acid, an anhydride of an unsaturated carboxylic acid, an ester of an unsaturated carboxylic acid, a salt of an unsaturated carboxylic acid, an amide of an unsaturated carboxylic acid, a nitrile of an unsaturated carboxylic acid, an allyl glycidyl ether and a methallyl glycidyl ether, the process comprising subjecting a starting mixture containing (a) said monomer and (b) a mixture of a water-soluble organic solvent and water to polymerization in the presence of a polymerization catalyst, wherein the starting mixture contains said monomer at a concentration of 50 to 700 g per liter of the total volume of (a) said monomer and (b) the mixture of the water-soluble organic solvent and water, wherein the volume ratio of the water-soluble organic solvent (A) to water (B) is (A):(B)=1:9 to 9:1, and wherein the polymerization catalyst is at least one member selected from the group consisting of (1) a metal compound represented by the formula (1)

$$L_p.M.X_q \quad (1)$$

wherein M is a member selected from the group consisting of Ti, Zr, Hf and V; L is at least one member selected from the group consisting of a cyclopentadienyl group, an indenyl group, a fluorenyl group, methylcyclopentadienyl, 1,2-dimethylcyclopentadienyl, 1,3-dimethylcyclopentadienyl, pentamethylcyclopentadienyl, n-butylcyclopentadienyl, tertbutylcyclopentadienyl, trimethylsilylcyclopentadienyl, 3-methylindenyl, 4-methylindenyl, 5-methylindenyl, 5-ethylindenyl and 4,7-dimethylindenyl; X is at least one member selected from the group consisting of a halogen atom, a hydrogen atom, a lower alkyl group, a lower alkoxy group, an aryloxy group, a phenyl group and a benzyl group; p represents an integer of at least 1, q represents an integer including 0 and the sum of p and q equals the valence of M, and (2) a metal compound represented by the formula (2)

$$R.M.Y_r \quad (2)$$

wherein M is a member selected from the group consisting of Ti, Zr, Hf and V; R is a group formed by bonding two identical or different groups selected from the group consisting of a cyclopentadienyl group, an indenyl group, a fluorenyl group, methylcyclopentadienyl, 1,2-dimethylcyclopentadienyl, 1,3-dimethyl-cyclopentadienyl, pentamethylcyclopentadienyl, n-butylcyclopenta-dienyl, tert-butylcyclopentadienyl, trimethylsilylcyclopentadienyl, 3-methylindenyl, 4-methylindenyl, 5-methylindenyl, 5-ethylindenyl and 4,7-dimethylindenyl, the two groups being bonded to each other via a lower alkylene or di(lower alkyl)silylene group; Y is at least one member selected from the group consisting of a halogen atom, a hydrogen atom, a lower alkyl group, a lower alkoxyl group, an aryloxy group, a phenyl group and a benzyl group; r is equal to (n−2) wherein n is the valence of M.

2. A process according to claim 1, wherein said monomer is a methacrylic acid alkyl ester or a mixture of a methacrylic acid alkyl ester and said monomer other than said methacrylic acid alkyl ester.

3. A process according to claim 1, wherein said monomer is methyl methacrylate or a mixture of methyl methacrylate and said monomer other than methyl methacrylate.

4. A process according to claim 1, wherein said monomer is methyl methacrylate.

5. A process according to claim 1, wherein the concentration of said monomer is 50 to 200 g per liter of the total volume of the mixture of the water-soluble organic solvent and water and said monomer.

6. A process according to claim 1, wherein the water-soluble organic solvent is selected from the group consisting of methanol, acetone and tetrahydrofuran.

7. A process according to claim 1, wherein the water-soluble organic solvent is methanol.

8. A process according to claim 1, wherein the volume ratio of the water-soluble organic solvent (A) to water (B) is (A):(B)=6:4 to 4:6.

9. A process according to claim 1, wherein the polymerization catalyst is a metal compound represented by the formula (1).

10. A process according to claim 1, wherein the polymerization catalyst is a metal compound represented by the formula (1) wherein M is Ti.

11. A process according to claim 1, wherein the polymerization catalyst is a metal compound represented by the formula (1) wherein M is Ti, L is a cyclopentadienyl group, p is 2, X is halogen and q is 2.

12. A process according to claim 1, wherein the concentration of the polymerization catalyst is $1\times10^{-4}$ to $2\times10^{-2}$ mole per liter of the total volume of the mixture of the water-soluble organic solvent and water, said monomer and at least one of the metal compounds of the formulas (1) and (2).

13. A process according to claim 1, wherein the concentration of polymerization catalyst is $1\times10^{-3}$ to $1\times10^{-2}$ mole per liter of the total volume of the mixture of the watersoluble organic solvent and water, said monomer and at least one of the metal compounds of the formulas (1) and (2).

14. A process according to claim 1 wherein the polymerization catalyst is a metal compound represented by the formula (2).

15. A process according to claim 1, wherein the polymerization time is about 1 to about 72 hours.

16. A process according to claim 1, wherein the polymerization temperature is $-10°$ C. to the ceiling temperature.

17. A process according to claim 1, wherein the polymerization temperature is 20° C. to 80° C.

18. A process according to claim 1, wherein the polymerization catalyst is at least one member selected from the group consisting of titanocene, bis($\eta^5$-pentamethylcyclopentadienyl) titanium dihalide, bis($\eta^5$-pentamethylcyclopentadienyl) diphenyl titanium, ($\eta^5$-cyclopentadienyl) zirconium dihalide, ($\eta^5$-cyclopentadienyl) hafnium dihalide, bis($\eta^5$-cyclopentadienyl) vanadium and ($\eta^5$-ethylenebisindenyl) titanium dihalide.

19. A process according to claim 1, wherein the polymerization catalyst is titanocene.

20. The process according to claim 1, wherein the polymerization catalyst is at least one member selected from the group consisting of a metal compound represented by formula (1) and a metal compound represented by formula (2), wherein the metal compound represented by formula (1) is at least one member selected from the group consisting of titanocene, ($\eta^5$-cyclopentadienyl) titanium dihalide, bis($\eta^5$-cyclopentadienyl) titanium halide, ($\eta^5$-pentamethylcyclopentadienyl) titanium dihalide, bis($\eta^5$-pentamethylcyclopentadienyl) titanium halide, ($\eta^5$-cyclopentadienyl) titanium trihalide, bis($\eta^5$-cyclopentadienyl) titanium dihalide, tris($\eta^5$-cyclopentadienyl) titanium halide, ($\eta^5$-pentamethylcyclopentadienyl) titanium trihalide, bis($\eta^5$-pentamethylcyclopentadienyl) titanium dihalide, tris($\eta^5$-pentamethylcyclopentadienyl) titanium halide, trimethyl ($\eta^5$-cyclopentadienyl) titanium, dimethylbis($\eta^5$-cyclopentadienyl) titanium, trimethyl($\eta^5$-pentamethylcyclentadienyl) titanium, dimethylbis($\eta^5$-pentamethylcyclopentadienyl) titanium, bis($\eta^5$-cyclopentadienyl)dipheny titanium, bis($\eta^5$-pentamethylcyclopentadienyl)diphenyl titanium, bis($\eta^5$-pentalmethylcyclopentadienyl) titanium dihydride, bis($\eta^5$-cyclopenta-dienyl)dibenzyl titanium, bis($\eta^5$-pentamethylcyclopentadienyl) dibenzyl titanium, bis($\eta^5$-indenyl) titanium dihalide, ($\eta^5$-indenyl) ($\eta^5$-cyclopentadienyl) titanium dihalide, ($\eta^5$-cyclopentadienyl) diphenoxy titanium, ($\eta^5$-cyclopentadienyl) zirconium dihalide, bis($\eta^5$-cyclopentadienyl) zirconium halide, ($\eta^5$-pentamethylcyclopentadienyl) zirconium dihalide, bis($\eta^5$-pentamethylcyclopentadienyl) zirconium halide, ($\eta^5$-cyclopentadienyl zirconium trihalide, bis($\eta^5$-cyclopentadienyl) zirconium dihalide, tris($\eta^5$-cyclopentadienyl) zirconium halide, ($\eta^5$-pentamethylcyclopentadienyl) zirconium trihalide, bis($\eta^5$-pentamethylcyclopentadienyl) zirconium dihalide, tris($\eta^5$-pentamethylcyclopentadienyl) zirconium halide, trimethyl ($\eta^5$-cyclopentadienyl) zirconium, dimethylbis($\eta^5$-cyclopentadienyl) zirconium, trimethyl ($\eta^5$-pentamethylcyclopentaldienyl) zirconium, dimethylbis ($\eta^5$-pentamethylcyclopentadienyl) zirconium, bis($\eta^5$-cyclopentadienyl)diphenyl zirconium, bis($\eta^5$-pentamethylcyclolpentadienyl)diphenylzirconium, bis($\eta^5$-pentamethylcyclopentadienyl) zirconium dihydride, bis($\eta^5$-cyclopentadienyl)dibenzyl zirconium, bis($\eta^5$-pentamethylcyclopentadienyl) dibenzyl zirconium, bis($\eta^5$-indenyl) zirconium dihalide, ($\eta^5$-indenyl) ($\eta^5$-cyclopentadienyl) zirconium dihalide, ($\eta^5$-cyclopentadienyl) diphenoxy zirconium, ($\eta^5$-cyclopentadienyl) hafnium dihalide, bis($\eta^5$-cyclopentadienyl) hafnium halide, ($\eta^5$-pentamethylcyclopentadienyl) hafnium dihalide, bis($\eta^5$-pentamethylcyclopentadienyl) hafnium halide, bis($\eta^5$-cyclopentadienyl) hafnium trihalide, bis($\eta^5$-cyclopentadienyl) hafnium dihalide, tris($\eta^5$-cyclopentadienyl) hafnium halide, ($\eta^5$-pentamethylcyclopentadienyl) hafnium trihalide, bis($\eta^5$-pentamethylcyclopentadienyl) hafnium dihalide, tris($\eta^5$-pentamethylcyclopentaldienyl) hafnium halide, trimethyl ($\eta^5$-cyclopentadienyl) hafnium, dimethylbis($\eta^5$-cyclopentadienyl) hafnium, trimethyl ($\eta^5$-pentamethylcyclopentadienyl) hafnium, dimethylbis ($\eta^5$-pentamethylcyclopentadienyl) hafnium, bis($\eta^5$-cyclopentadienyl)diphenyl hafnium, bis ($\eta^5$-pentamethylcyclopentadienyl)diphenyl hafnium, bis($\eta^5$-pentamethylcyclopentadienyl) hafnium, bis($\eta^5$-cyclopentadienyl) dibenzyl hafnium dihydride, bis($\eta^5$-pentamethylcyclopentadienyl) dibenzyl hafnium, bis($\eta^5$-indenyl) hafnium dihalide, ($\eta^5$-indenyl)($\eta^5$-cyclopentadienyl) hafnium dihalide, ($\eta^5$-cyclopentadienyl) diphenoxy hafnium, bis($\eta^5$-cyclopentadienyl) vanadium, bis ($\eta^5$-pentamethylcyclopentadienyl) vanadium, ($\eta^5$-cyclopentadienyl) vanadium dihalide, bis($\eta^5$-cyclopentadienyl) vanadium halide, ($\eta^5$-pentamethylcyclopentadienyl) vanadium dihalide, bis($\eta^5$-pentamethylcyclopentadienyl) vanadium halide, ($\eta^5$-cyclopentadienyl) vanadium trihalide, bis($\eta^5$-cyclopentadienyl) vanadium dihalide, tris($\eta^5$-cyclopentadienyl) vanadium halide, ($\eta^5$-pentamethylcyclopentadienyl) vanadium trihalide, bis($\eta^5$-pentamethylcyclopentadienyl) vanadium dihalide, tris($\eta^5$-pentamethylcyclopentadienyl) vanadium halide, trimethyl ($\eta^5$-cyclopentadienyl) vanadium, dimethylbis ($\eta^5$-cyclopentadienyl) vanadium, trimethyl ($\eta^5$-pentamethylcyclopentadienyl) vanadium, dimethylbis ($\eta^5$-pentamethylcyclopentadienyl) vanadium, bis($\eta^5$-cyclopentadienyl) diphenyl vanadium, bis($\eta^5$-pentamethylcyclopentadienyl) diphenyl vanadium, bis($\eta^5$-pentamethylcyclopentadienyl) vanadium, bis($\eta^5$-cyclopentadienyl)dibenzyl vanadium dihydride, bis($\eta^5$-pentamethylcyclopentadienyl) dibenzyl vanadium, bis($\eta^5$-indenyl) vanadium dihalide, ($\eta^5$-indenyl) ($\eta^5$-cyclopentadienyl) vanadium dihalide, and ($\eta^5$-cyclopentadienyl) diphenoxy vanadium.

* * * * *